(12) United States Patent
Cirette et al.

(10) Patent No.: US 10,899,557 B2
(45) Date of Patent: Jan. 26, 2021

(54) PRODUCT TRANSFER

(71) Applicant: SIDEL PACKING SOLUTIONS, Corcelles les Citeaux (FR)

(72) Inventors: Damien Cirette, Corcelles les Citeaux (FR); Dominique Rabec, Corcelles les Citeaux (FR)

(73) Assignee: SIDEL PACKING SOLUTIONS, Corcelles-les-Citeaux (FR)

( * ) Notice: Subject to any disclaimer, the term of this patent is extended or adjusted under 35 U.S.C. 154(b) by 0 days.

(21) Appl. No.: 16/343,728

(22) PCT Filed: Oct. 17, 2017

(86) PCT No.: PCT/FR2017/052850
§ 371 (c)(1),
(2) Date: Apr. 19, 2019

(87) PCT Pub. No.: WO2018/073529
PCT Pub. Date: Apr. 26, 2018

(65) Prior Publication Data
US 2019/0270599 A1    Sep. 5, 2019

(30) Foreign Application Priority Data
Oct. 20, 2016 (FR) .................................. 16 60176

(51) Int. Cl.
*B65G 47/82* (2006.01)
*B65G 47/71* (2006.01)

(52) U.S. Cl.
CPC .......... *B65G 47/82* (2013.01); *B65G 47/715* (2013.01); *B65G 2201/0235* (2013.01)

(58) Field of Classification Search
CPC ............................... B65G 47/82; B65G 47/715
See application file for complete search history.

(56) References Cited

U.S. PATENT DOCUMENTS 1,980,411 A    11/1934 Kimball et al.
2,252,937 A    8/1941 Link et al.
(Continued)

FOREIGN PATENT DOCUMENTS

DE    20107848 U1    2/2002
EP    2204342 A1    7/2010
(Continued)

OTHER PUBLICATIONS

Cosmapack Internatonal S.r.l., "FORMINC600S handling glass bottles with rotating pusher device", URL: <https://www.youtube.com/watch?v=8HquplfNiM4>, Published Jul. 16, 2015.
(Continued)

*Primary Examiner* — William R Harp (57) ABSTRACT

Disclosed is a device for transferring products, which includes a delivery unit for delivering said products, which moves them one behind the other in a feed direction, and, on the other hand, an output conveyor, extending from the delivery unit, transversely to the delivery direction. This device further includes a rotary tool that rotates about a rotation axis, this tool having collectors distributed radially about the axis and being movable parallel to the delivery direction, such that the rotation of the tool causes each successive collector to release a group of products from the delivery means to the outlet conveyor. Also disclosed is a corresponding method.

20 Claims, 3 Drawing Sheets

(56) References Cited

U.S. PATENT DOCUMENTS

| | | | |
|---|---|---|---|
| 3,244,266 A * | 4/1966 | Zappia | C03B 35/085 |
| | | | 198/430 |
| 3,687,262 A | 8/1972 | Campbell et al. | |
| 7,416,072 B2 | 8/2008 | Gosset | |
| 7,992,700 B2 * | 8/2011 | Thoonsen | B65G 47/82 |
| | | | 198/370.08 |
| 8,167,113 B2 | 5/2012 | Mougin et al. | |
| 8,485,342 B2 | 7/2013 | Mougin et al. | |
| 9,327,914 B1 * | 5/2016 | Dallan | B65G 47/52 |
| 10,336,547 B2 * | 7/2019 | Meier | B65G 15/22 |
| 2004/0050661 A1 | 3/2004 | Leidy et al. | |

FOREIGN PATENT DOCUMENTS

| | | |
|---|---|---|
| EP | 2167409 B1 | 4/2012 |
| EP | 2594513 A1 | 5/2013 |
| EP | 1560772 B1 | 9/2015 |
| FR | 2847242 A1 | 5/2004 |
| FR | 2918359 A1 | 1/2009 |
| JP | S57-71131 U | 4/1982 |
| WO | 96/13466 A1 | 5/1996 |

OTHER PUBLICATIONS

International Search Report, dated Dec. 6, 2017, from corresponding PCT application No. PCT/FR2017/052850.

* cited by examiner

PRODUCT TRANSFER

BACKGROUND OF THE INVENTION

Field of the Invention

This invention pertains to the field of equipment for the grouping and packaging of products in industrial quantities and has as its object, on the one hand, a particular transfer device, and, on the other hand, a method using this device.

Description of the Related Art

The field of packaging by groups of products of the bottle, jar, or other container type generally involves a conveying of products one behind the other, i.e., in a single-line column, which must then be transformed into a series of groups of products, often organized in a matrix manner, with several products in a line and several products in a column.

For this type of transfer, conventional techniques propose providing a comb equipped with successive collection recesses. The recesses are one next to the other perpendicular to the direction of arrival of the products and are placed successively one after the other facing the single-line flow. Thus, a group of products is created that is distributed perpendicular to the supply direction. The batches created are, however, perpendicular to the input direction, which cannot be compatible with certain installations.

Conventional techniques also disclose conveyors on which incoming products travel in the form of a single-line column, successive push bars being provided to remove, each at the same time, a group of products onto an output conveyor that travels at an acute angle in relation to the input direction. It is, however, necessary to provide a piece of equipment that creates a space on the input conveyor between two successive batches.

Generally, in systems using a pusher that simultaneously removes to the side several incoming products forming a batch, it is common to provide upstream a space between the successive batches, to allow time for the pusher to remove each batch. This has impacts on the complexity of the installation and its cost, considering the additional device necessary upstream, as well as on the rate.

SUMMARY OF THE INVENTION

The invention has as its object to improve this state of the art by contributing to addressing the above drawbacks.

To do this, the invention proposes providing that the transverse removal tool follow at least temporarily the longitudinal movement of the products when it removes them transversely.

The invention thus has as its object a device for product transfer, which comprises, on the one hand, a means for supplying said products, which moves them one behind the other in a supply direction, and, on the other hand, an output conveyor, extending from the supply means, transversely to the supply direction.

This device is characterized in that it comprises, in addition, a tool rotating around an axis of rotation that is parallel to the supply direction, said tool having collectors distributed radially around said axis and being mobile in translation parallel to the supply direction.

The invention also has as its object a method used by this device, namely a method of product transfer comprising steps consisting in supplying products one behind the other in a supply direction, extracting the products by successive batches of at least two products each, by a movement that is transverse to the supply direction, and removing the batches of products in an output direction that is transverse to the supply direction.

This method is characterized in that the extraction of the products takes place using a tool driven with a rotary movement around an axis of rotation that is parallel to the supply direction and is accompanied by a movement of said tool that follows the supply of the products.

BRIEF DESCRIPTION OF THE DRAWINGS

The invention will be better understood using the description below, which is based on possible embodiments, explained in an illustrative and in no way limiting way, with reference to the accompanying figures, in which.

DESCRIPTION OF THE PREFERRED EMBODIMENTS

Therefore, the invention first of all has as its object a device 1 for transfer of products 2, which comprises, on the one hand, a means 4 for supplying said products 2, which moves them one behind the other in a supply direction 3, and, on the other hand, an output conveyor 5, extending from the supply means 4, transversely to the supply direction 3.

This flow of products enters into the transfer device 1 by the supply means 4, which means or supply conveyor 4 can be a conveyor with a screw for orienting and spacing the product. These various supply means 4 optionally have as a function, in addition, to create a space between each batch 13 of products. Each batch of products thus formed by the supply means is moved perpendicularly onto an output conveyor 5.

The transfer device 1 is thus used to move products 2 from a supply means 4 onto an output conveyor 5 that moves them perpendicular to the supply means 4. The supply means 4 preferably comprises a belt conveyor, on which the products 2 rest by their bottoms and then extend vertically. Optionally, it also comprises screws or belts for spacing and even turning, or alternately a device to detect the relative position of the products 2 in the supply means. The supply means 4 can also, for example, comprise a braking system, such as, for example, longitudinal belts having vertical panels, which have the effect, for example, of slowing down the products 2 in relation to the conveyor below, and therefore ensuring an accumulation and a position of the products 2 one against the other within the single-line column. The supply means 4 can therefore, if necessary, have means that enclose the flow of products 2 on two sides. The supply means 4, however, has a portion, namely a downstream end, where the products 2 are accessible from the side, for an action by the tool 6 as described below. In this end zone, or supply zone, the transfer device 1 is therefore without means that border on both sides the channel in which the flow of products 2 passes. It is from this end zone that the output conveyor 5 extends, perpendicular to the conveyor that has the supply means 4, i.e., from one of its edges.

The products 2 are preferably products 2 that travel at an industrial rate and have a flat base for their support and a perpendicular axis along which they extend, such as a bottle, a can, a carton, a jar, etc.

According to the invention, the device comprises, in addition, a tool 6 rotating around an axis of rotation 7 that is parallel to the supply direction 3, said tool 6 having collectors 8 that are distributed radially around said axis and that are mobile in translation parallel to the supply direction 3, so that by the rotation of the tool 6, each successive collector removes a group of products 2 from the supply means 4 onto the output conveyor 5.

The rotating tool 6 turns around its axis of rotation 7 and is positioned essentially perpendicular to the end zone of the supply means 4, where it makes the products 2 accessible from the side. As will be described below, the tool 6 can optionally be able to be placed in the output direction 9.

Generally, the tool 6 is positioned in relation to the extension of the column of products 2 that enter in such a way that the collector 8, which is applied against the products 2 under the effect of the rotation of the tool 6, is at least temporarily found on the other side of the output conveyor 5 relative to the column of products 2 or the batch 13 to be pushed. For example, the tool is positioned with its axis of rotation 7 roughly in the extension of the column of products 2 moved by the supply means 4, or slightly beyond to the output conveyor 5.

The tool 6 is mobile in the supply direction 3, in the direction of movement that the supply means 4 causes when a collector 8 pushes the products 2, and in the reverse direction with the objective of the same movement for the following collector 8.

The collector 8 thus follows the longitudinal movement, in the supply direction 3, of the products 2 of which it must cause a movement in the output direction 9, to bring them onto the output conveyor 5. The collector 8 has, preferably in the area of its most upstream end from the supply direction 3, a hooking surface that extends to oppose the progression of the flow, this surface being inserted into the space created between two concave products 2 or between two products 2 belonging to different batches.

During the process, the products 2 are normally supplied continuously by the supply means 4, and the tool 6 turns continuously, as well as the output conveyor 5, which continuously removes the successive batches 13 that the tool 6 extracts from the supply means 4.

A collector 8 is used preferably to act on several products 2 simultaneously, preferably at least two.

It is understood that the rotation of the tool 6 moves the products 2 perpendicular to the supply direction 3. The output direction 9 is, itself, preferably, perpendicular to the supply direction 3.

According to a possible additional characteristic, the output conveyor 5 removes the products 2 in an output direction 9 perpendicular to the supply direction 3, the tool 6 being able to move in the output direction 9, so as to accompany over a larger distance the movement of the products 2 from the supply means 4 onto the output conveyor 5. The tool 6 is therefore movable in the two orientations of the output direction 9. It is understood that it is moved in the same direction as the output conveyor 5 when one of its collectors 8, having arrived at the end point of its rotation, releases the products 2 there. It is moved in the reverse direction to come back to the same point for the following cycle.

In certain embodiments, the tool 6 deposits the products 2 on a stationary surface, of the stationary plate type. It then backs away in the output direction 9 and in the reverse direction. The products 2 are then pushed by bars of the cycler-bar type, which then optionally form the output conveyor 5, which conveys the products 2 by pushing from their side. Such bars can also be used to push the products 2 onto a belt conveyor, or output conveyor.

According to another possible characteristic, each collector 8 has a series of notches 10 one next to the other parallel to the axis of rotation 7, each notch 10 being intended to receive one product 2, or even more. Generally, a notch 10 delimits an edge for the product 2, upstream and/or downstream from the supply direction 3, as well as an edge for a push toward the output conveyor 5. The edges can have a shape that is more or less specific and complementary to the product 2, or else be carried by bumper means that then define only contact zones.

By way of example, the notch 10 can be provided simply by, on the one hand, a bar extending parallel to the axis of rotation 7 to form the bottom of the notch 10 for the push toward the output conveyor 5, and, on the other hand, a pin that extends from said bar, transversely, and that therefore forms a stop for the product 2 in its supply movement by the supply means 4. The notch 10 preferably, however, has a bottom that incorporates at least partially the curvature of the product 2, for a better hold.

According to another possible additional characteristic, the bottom of the notch 10 is convex for a continuity of contact during the rotation of the tool 6. Thus, the bottom of the notch optionally has a concave section, observed perpendicular to the axis of rotation 7. It is thus ensured that the movement of the collector 8 is transmitted to the product 2 in the form of a force that is parallel to the plane formed by the supply direction 3 and the output direction, namely essentially a horizontal plane.

In particular embodiments, the notch 10 has a profile that, during the push toward the output conveyor 5 under the effect of the rotation of the tool 6, facilitates the rotation of the product 2 around an axis perpendicular both to the supply direction 3 and the output direction 9 of the output conveyor 5. Actually, by opting for a notch 10 that can approach the product 2 asymmetrically in relation to its own axis of symmetry that is perpendicular to its base, it is possible to cause a rotation of the product 2 around said axis.

It is thus possible to opt for a notch that embodies only one stop for the product 2 downstream in relation to it in the direction of the supply of the products 2 and not also the upstream stop. The notch can then push the product by creating an asymmetrical force, which will make it turn.

Finally, in particular embodiments, the device comprises a frame 11 made of beams 12, and, on the one hand, a first motor driving the tool 6 in rotation around the axis of rotation 7 and mounted on a first beam 12 that is mobile parallel to the axis of rotation 7, on which the tool 6 is attached cantilevered, and essentially vertical, and, on the other hand, a second motor driving the first beam 12 in translation along a second beam 12, which is horizontal, parallel to the axis of rotation 7.

The second beam 12 thus defines a horizontal guiding structure, in the supply direction, and is found essentially above the tool 6, itself above the supply means 4 and the output conveyor 5. The first beam 12, in turn, extends cantilevered, downward, from the second beam 12, and therefore travels in the supply direction 3 to make it possible for the tool to follow the movement of the products 2 when it pushes them onto the output conveyor 5. Mounted at the other end is the tool 6, mobile in rotation. The motor for driving the tool 6 in rotation is preferably installed on the first beam 12.

The invention also has as its object a method using the device as described above, namely a method for transferring products 2 comprising steps consisting in supplying products 2 one behind the other in a supply direction 3, extracting the products 2 by successive batches 13 of at least two products 2 each, by a movement that is transverse to the supply direction 3, and removing the batches 13 of products 2 in an output direction 9 that is transverse to the supply direction 3.

The products are supplied using the supply means 4, then are extracted in a flat sweeping movement onto an output conveyor 5 that then moves them perpendicularly. Thus, a single-line flow of products 2 entering one behind the other is transformed into a flow that progresses perpendicularly and that comprises successive batches 13, spaced from one another along the output direction 9. The extraction of the products 2 takes place by means of the above-mentioned rotating tool 6 and has the effect of dividing the continuous flow of products 2 into a sequence of spaced batches 13.

The extraction of products 2 therefore takes place by batches 13, in that it takes place cyclically, every time for a group of products 2, or batch 13. As has already been mentioned, each cycle is ensured by a collector 8 or pusher whose tool 6 is provided on its periphery and that acts simultaneously on several products 2.

The removal of products 2 occurs downstream from the extraction and takes place continuously, in that the output conveyor 5 can be driven continuously with a movement. The supply means 4 can, likewise, operate continuously.

According to the invention, the extraction of the products 2 occurs using a tool 6 driven with a rotating movement around an axis of rotation 7 that is parallel to the supply direction 3 and is accompanied by a movement of said tool 6 that follows the supply of the products 2, the rotation speed of the tool 6 being able in particular to be variable to reduce—and even prevent—the impact on the products 2 upon its coming in contact. The movement is cyclical to accompany the advance of the products 2 along the supply direction 3 despite the fact that the tool 6 causes, by its rotation, a movement that is transverse to the axis of rotation 7 and to the supply direction 3, parallel, namely the extraction.

The movement is thus synchronized: the tool 6 is moved at the same speed as the supply means conveyor 4 during at least one portion of the step for extraction of the products 2, then goes back into initial position to deal with the following batch 13. That make it possible not to stop the products 2 between two batches to create a gap for the insertion and the transverse movement of a pusher.

The tool 6 is thus provided with several collectors 8 distributed at regular angles along its circumference, and each collector 8 is intended to act on at least one product 2, as a result of at least one notch 10 that bears contact surfaces.

When the products 2 are extracted by the tool 6 due to its peripheral speed, said tool 6 is moved in the same manner as the products 2 in the supply direction 3 in relation to the ground: same direction, same orientation, and same speed, at least temporarily. One of the benefits of shadowing the speed is to restrict the movement of the products 2 in relation to the support surface to a movement in the output direction 9.

Generally, the speed of the tool 6 along the supply direction 3, when it follows the products 2 that it must extract, can correspond to that of the products 2 until the batch 13 to be offset is no longer facing the column of incoming products 2, or can even be greater if the tool 6 can be used to create a spacing between batches 13. It is also possible to reduce the speed of the tool 6 to force the products 2 to pivot under the effect of the supply means 4, then in overspeed in relation to the tool 6. Of course, since this movement along the supply direction 3 is to be performed each cycle, the tool 6 travels alternately in the same direction as the products 2 that it deals with, then in the reverse direction, to come back into position for the next batch.

It will be noted that in a preferred way, the conveyor of the supply means 4, which can be the supply means 4 itself, is preferably wide enough to receive two columns of products 2 concurrently. Actually, it can be advantageous to offset the batch 13 of products 2 transversely in relation to the column and that it remains in contact with the conveyor during the entire extraction operation, so as to prevent changes in longitudinal speed that are too great.

According to a possible additional characteristic, the tool 6 is driven by a movement that is transverse to the supply direction 3 to accompany the extraction of the products 2 to the output conveyor 5. This movement is itself also cyclical, since the tool 6 must temporarily be in a position making it possible for a collector 8 on its periphery to come against the column of products 2, then making it possible for this same collector 8 to release the products 2 onto the output conveyor 5. This movement that is perpendicular to the supply direction 3 can take place in the direction of the output conveyor 5 when it involves extracting the products 2 there. Apart from the return to position, a movement in the reverse direction from the advance on the output conveyor 5 can be useful, for example, to reduce the difference in speed along this direction during the contact between the collector 8 and the products 2.

According to another possible additional characteristic, the products 2 extend vertically, perpendicular both to the supply direction 3 and to the output direction 9 that is perpendicular to it, the movement of the tool 6 along the supply direction 3 during the extraction of the products 2 being such that the push of the tool 6 by its rotation causes a change of orientation of said products 2 around their vertical axis.

The axial relative movement along the supply direction 3 between the tool 6 and the supply means 4 is such that the notch 10 of the collector 8 causes the product 2 to turn around the vertical axis. The tool 6 can thus, for example, temporarily during the cycle, have a slight underspeed in relation to the supply means 4, the latter then pressing the products 2 against the notches, which, having a suitable shape, cause the rotation of the products around the vertical axis.

Finally, in certain embodiments, the products 2 are supplied by the supply means 4, in the form of a belt conveyor, in a single-line column extending in the supply direction 3, then are extracted onto the output conveyor 5 by the tool 6 in batches 13 that, each, formed by the transverse push exerted by a collector 8 of the tool 6, extend in the supply direction 3, and that are separated from one another on the output conveyor 5 along the output direction 9.

The spacing between two successive batches on the output conveyor 5 depends in particular on the speed of the output conveyor 5 and on the angular spacing between two collectors 8.

It can be conceived that on the output conveyor 5, the products 2 be then pushed by transverse bars, of the chain-driven bar type or cycler-bar type, which make it possible to reference the products 2 by back pushing.

In the embodiment illustrated in the accompanying figures, the transfer device 1 comprises a stationary structure into which the products 2 are moved.

The supply means 4 preferably takes the form of a belt conveyor, on which the products 2 rest. They stand generally one following the other in a single-line column, which extends in the supply direction. In certain cases, the supply means 4 comprises a pair of counter-rotating screws, which move the products 2 using their thread. The threads can be of changing form during the advance of the product 2, for the purpose of causing the rotation of the products 2, particularly of the products 2 having a non-circular base.

The supply means 4 therefore supplies products 2 one behind the other in an end zone from which they will be pushed onto an output conveyor 5 that extends from said zone, in a direction perpendicular to the supply direction 3 and referred to as output direction 9.

The output conveyor 5 extends perpendicular to the supply means 4; i.e., perpendicular to the supply direction 3. The output conveyor 5 extends from one edge of the conveyor that the supply means 4 supplies in an end zone, if necessary. A stationary belt can be used to cover the groove formed between the edge of the supply means 4 and the deflection roller of the output conveyor 5.

Thus, the transfer device 1 receives, at input, the products 2 in the form of a column that extends in the supply direction 3 in the area of the supply means 4, and delivers, at output, onto the output conveyor 5, batches 13, separated from one another on the output conveyor 5 in the output direction 9, each comprising at least one product 2 and preferably at least two aligned in the orientation of the supply direction 3. Downstream from this transfer device 1, the products 2 in batch 13 are optionally separated into travel lanes parallel to the output direction 9, or else regrouped against one another by group to form an array of products 2 ready to be packaged, by bundling, by boxing, or the like.

This transformation that the transfer device 1 carries out from a compact single-line flow extending in the supply direction 3 to a transverse multi-line flow of separated products 2 takes place as the result of a tool 6 described below, which works in the end zone where the products 2 are supplied by the supply means 4.

In operation, said tool 6 is driven by a controlled movement of rotation around an axis of rotation 7 that is parallel to the supply direction. It therefore has, for example, a rotating plate, positioned downstream from the supply means 4, and from which collectors 8 extend. Each collector 8 extends parallel to the axis of rotation 7, and therefore to the supply direction 3, from the plate, and in cantilever. The tool 6 therefore develops a tubular pathway in the area of its collectors 8. Each collector 8, under the effect of the rotation of the tool 6, exerts, on the products 2 delivered by the supply means 3, a pushing force that removes them transversely onto the output conveyor 5 from the supply zone.

Each collector 8 thus has the width sufficient to push several products 2 at one time. For this purpose, in possible embodiments, the collector 8 can be provided with referencing surfaces for each product 2 separately, also called notches 10. A notch 10 thus makes it possible to limit the movement of a product 2 parallel to the output direction 9 as well as to push the product by the rotation of the tool. The notch 10 can have a profile that is exactly complementary to the shape of the product 2 or else have only reference points or reference surfaces, for example defined by blocks mounted on the collector 8, optionally mobile blocks for adjustment purposes.

It is understood that the tool 6 is positioned so that when a collector 8 is in low position, it arrives at the height of the products 2 that are found in the supply zone, so as to be able to push them laterally.

The tool 6 has several collectors 8 distributed regularly and spaced in relation to one another by a predefined angle, guaranteeing a good balance. The tool 6 is found in the extension of the supply means 4 and acts in the area of the supply zone where the position of the products is no longer delimited on the sides.

The supply means 4 generally comprises a belt conveyor that extends to an end zone or supply zone, perpendicular to which the collectors 8 of the tool 6 travel. Thus, the products 2 continue to advance in the supply direction 3 despite the fact that they are pushed transversely toward the output conveyor 5 by the tool 6. Further, for the purpose of attaining high rates, the supply means 4 operates continuously. In certain configurations, however, the supply means 4 itself optionally creates a slight longitudinal space between the batches 13 that the tool 6 is going to offset.

To ensure that the transverse pushing of the products 2 by the collector 8 does not destabilize the products 2, both those still upstream and those that it is pushing, the tool 6 is driven by a movement along the supply direction 3, to follow the movement of the products 2 in relation to the ground. Thus, when one of its collectors 8 acts on the products 2, the entire tool 6 follows the movement that the supply means 3 makes the products 2 undergo, i.e., it advances like them in the same orientation in this direction. As described below, slight variations in speed are possible.

The collector 8 in contact with products 2 that are moved by the supply means 4 thus moves, at least temporarily, at the same speed as the conveyor that the latter comprises, in the corresponding embodiments.

The tool 6 is therefore driven by a cyclical reciprocating movement along the supply direction 3: it advances in the same orientation as the products 2 when a collector 8 transfers products 2, then advances in the reverse direction to search for the following batch 13. In certain embodiments, this longitudinal movement of the tool 6 along the supply direction 3 and in the direction of advance of the products 2 stops once the products have arrived on the output conveyor 5. Thus avoided are dangerous relative movements between the products 2 and their means of conveying by the bottom, i.e., supply means 4, then output conveyor 5.

More specifically, stopping the longitudinal movement of the tool 6 in the supply direction 3 and in the direction of travel of the products 2 can be conceived as soon as the collector 8 that pushes the products 2 is no longer facing the column of products 2 to be dealt with subsequently. The most upstream product 2 of the batch 13 offset by the collector 8 can then catch up, then overtake the most downstream product 2 of the column of products 2 to be dealt with subsequently.

As a result of this cyclical movement raising and dropping the column of incoming products 2, destabilizing the products 2, or even blocking them is avoided when the collector 8 comes into action. The rate is better as well. Preferably, at least at the beginning of the action of the collector 8, the latter travels with the same speed as the products 2 that are carried by the supply means 4.

It is understood that the transverse transfer of the products 2 from the supply means 4 onto the output conveyor 5 takes place by the peripheral pushing movement of the successive collectors 8, each movement forming a batch 13. To prevent contact between the collector 8 and the products 2 of the batch 13 to be offset from destabilizing them, and according to a possible characteristic, the speed of movement of the collectors 8 in relation to the products 2, in the output direction 9, is reduced at the moment when the collector 8 comes into contact with the products 2. Thus, a transverse acceleration, along the output direction 9, is created that is low enough to ensure that the products 2 do not experience the equivalent of an impact.

Preferably, the tool 6 has its speed of rotation reduced when a collector comes into contact with the products 2 relative to that which it has otherwise. Its rotation is therefore at a variable speed.

In particular embodiment cases, the tool 6 can, furthermore, be moved parallel to the output direction 9. That can be used, for example, to reduce the speed of the collector 8 during the contact: the tool 6 can then be driven by a constant speed of rotation, but it is its movement along the output direction 9 that adjusts the speed of the collector 8 in relation to the product 2 along the output direction 9.

This possibility of movement of the tool 6, i.e., of its axis of rotation 7, in the output direction 9, also makes possible a greater range of movement of the products 2 from the column that they form with the supply means 4 to the batches 13 offset on the side, and this even with a tool 6 whose distance between the axis of rotation 7 and the collectors 8, i.e., the radius, is small.

The structure of the transfer device 1 can then comprise a frame 11 made, for example, from beams 12. A first driving motor is provided to cause the translation of an assembly along the output direction 9. Within this assembly, a second motor is provided, which motor is therefore mobile considering the previously-described movement, this second motor ensuring the movement of a subassembly in the supply direction 3. Preferably, this subassembly travels along a horizontal beam 12, oriented in the supply direction 3, and comprises a vertical beam 12, whose upper end base is used as a basis for guidance. This subassembly finally comprises, in turn, a third motor, driven by described movements along the supply direction 3 and along the output direction 9. This third motor, in turn, drives the tool 6 itself in rotation around its axis of rotation 7.

It is understood that in certain configurations, the first motor is not useful and that the assembly that it renders mobile along the output direction 9 is then stationary in relation to it. Further, the sequence of the movements in relation to the ground can be different from that described above: the first motor is used to move an assembly in the supply direction; the second is used to move it in the output direction, etc. Generally, the linear movements are ensured by linear guides of the slide type, mounted in the beams 12 of the frame 11.

In certain embodiments, the collector 8 has one notch 10 per product 2 to be driven to the side. This notch more or less has a shape that is complementary to the product 2. The tool 6 can then be driven in its movement along the supply direction 3 to cause the rotation of the product 2 around an axis perpendicular to the plane of its support and therefore normally vertical.

Actually, the supply direction 3 and the output direction 9 define a normally horizontal plane. In certain configurations, the product 2 can have a horizontal section that has an asymmetry such that it is possible to define an angular position of such a product 2 around the vertical axis. In such cases, it can be necessary to rotate the products 2 between the position that they have when they are on the supply means 4 and the position that they must have on the output conveyor 5, which is particularly described in the accompanying figures.

The notch 10 can in fact comprise an end edge, for example the end of a jaw whose side is intended to hold the product 2 in its movement that is parallel to the supply direction 3. When the collector 8 arrives on the products 2 to be moved, its relative position is such that this end edge comes not beyond the product 2 as is the case once the product 2 is stabilized in the notch, but comes against the product 2, between its vertical axis of symmetry and its closest edge.

The rotation of the tool 6 then has the effect of exerting a force that is not symmetrical in relation to the vertical axis of symmetry of the product 2 that causes the rotation of the product 2 around the vertical axis, see the figure. This movement of rotation of the tool 6 continues until turning the product 2 optionally by a quarter of a turn, which makes it possible to convey products 2 initially oriented with their long edge parallel to the supply direction 3 to an orientation with their long edge perpendicular to this direction.

It is understood that this movement of rotation of the tool 6 around its axis of rotation 7 for purposes of rotation of product 2 can be accompanied by a relative movement between the products 2 and the tool 6 in the supply direction 4. For example, the collector 8 can initially travel along the supply direction 3 with the same speed as the products 2, then, to complete the rotation around the vertical axis, continue with a slightly lower speed, which will have the effect that the supply means 4, more specifically the belt conveyor on which they rest, will by its action force the products 2 against a surface of the notch 10 that will be able to complete the rotation of the product 2.

Furthermore, preferably, the notch 10, and more generally the collector 8 in the area of its surface intended to be in contact with the product 2, has a convex profile, which has the effect of ensuring that the force exerted by the collector 8 on the product 2 is always, at least as much as possible, in the plane formed by the output direction 9 and the supply direction 3.

Figure 1:
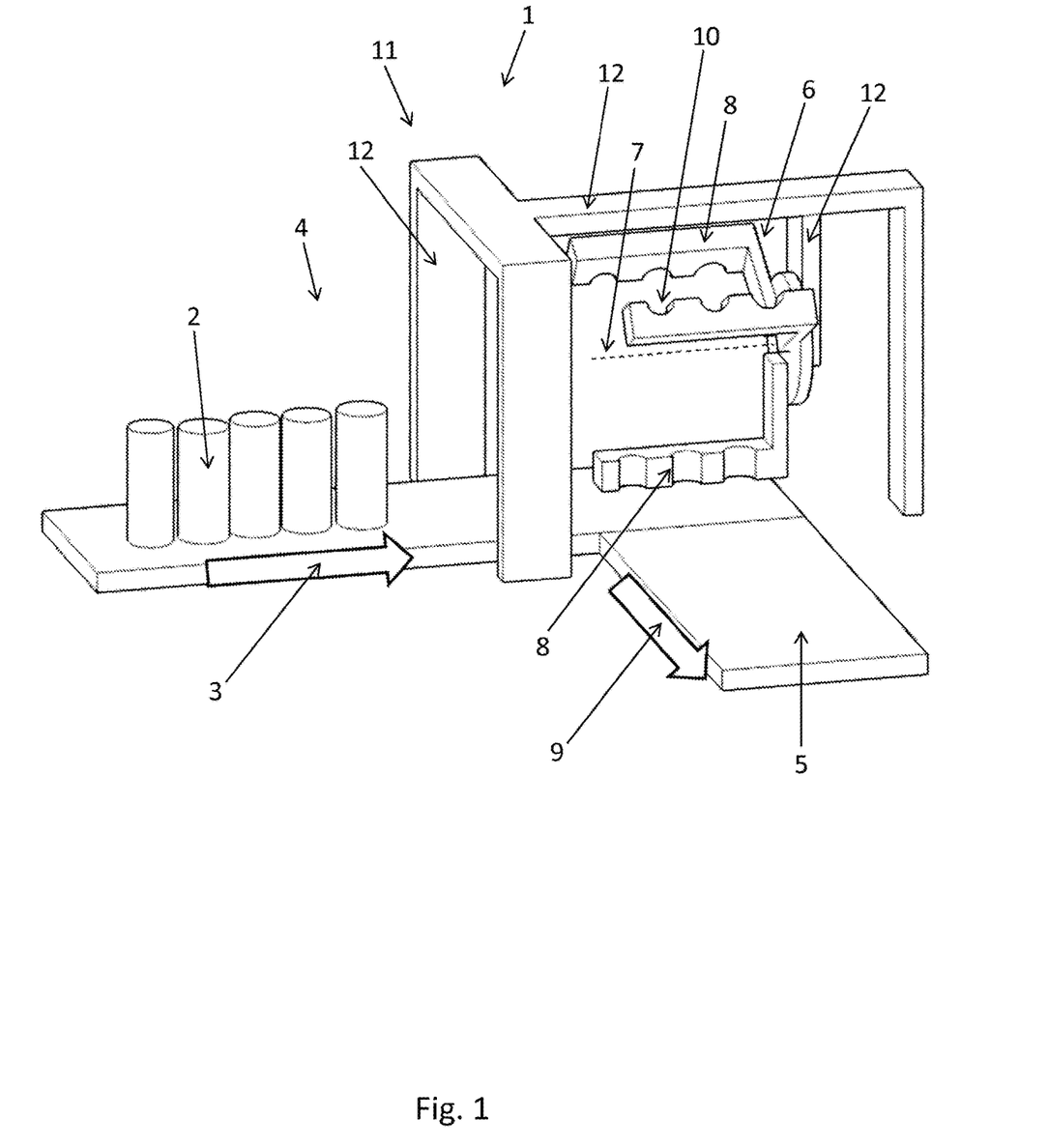
FIG. 1 shows a possible installation of a device according to the invention.

As shown in FIG. 1, a transfer device 1 comprises a means 4 for supplying products 2 that come, for example, from a preparation machine located upstream from the transfer device 1 such as a filling machine or a labeling machine, not shown in FIG. 1.

The products 2 arrive in a line, in a row, by the supply means 4 such as a chain conveyor or endless belt conveyor, following a supply direction 3.

At the upstream end of the supply means, not shown in FIG. 1, can be found a spacing device so as to create a spacing in the row of products or a device for orienting the products so as to cause the product to turn according to its vertical axis such as a screw for spacing or for orienting products.

At the downstream end of the supply means is found an output conveyor 5 oriented transversely to the supply means 4 and therefore to the supply direction 3 of the products. This output conveyor 5 feeds a machine, not shown, by batch of products. This machine located downstream can particularly be a bundler.

At the downstream end of the supply means 4, the products 2 are transferred from the supply means to the output conveyor 5 by the transfer device 1.

The transfer device comprises a tool 6 rotating around an axis of rotation 7 that is parallel to the supply direction 3.

This tool 6 comprises collectors 8 intended to receive batches 13 of products 2. They are distributed radially around the axis of rotation 7 and parallel to the supply direction of the products.

The collector 8 is a customized part that can be changed or adapted, particularly by adjusting, as a function of the batches 13 of products to form and to transfer.

Each collector appears in the form of a series of notches 10, one beside the other and parallel to the axis of rotation 7, or in the form of a push bar, pushing all of the products at the same time onto the output conveyor 5 or onto a stationary plate from where they will be taken by an element of the cycler-bar type, for example.

In the embodiment where the collector is equipped with notches, they have the shape of the product that they are going to capture to perform then the transfer.

In general, the bottom of these notches is convex to increase the continuity of the contact with the base of the product to grasp.

The tool is also mobile in translation parallel to the supply direction 3 of the products 2. This movement of translation of the tool will be described in the following description.

To perform these various movements of rotation and of translation, the tool 6 is mobile, carried and guided by a carrying structure that comprises a stationary frame 11 made of beams 12 that is located partly above the supply means 4 and also located partly above the output conveyor 5 so as to facilitate the transfer of the batch of products between the supply means and the output conveyor.

A first motor, not shown, drives the tool 6 in rotation around the axis of rotation 7. This motor is mounted on a vertical first beam 12, on which the cantilevered tool 6 is attached, and above the supply means 4.

A second motor, not shown, drives the tool that is attached on the first beam 12 in translation along a horizontal beam 12 that is parallel to the axis of rotation 7 and to the supply direction of the products.

A third motor drives the tool that is attached on the first beam 12 in translation along a horizontal beam 12 that is parallel to the output direction 9.

The fact of having a motor per movement makes it possible to vary the speed of the collector during the process and to have a great flexibility.

Figure 2:
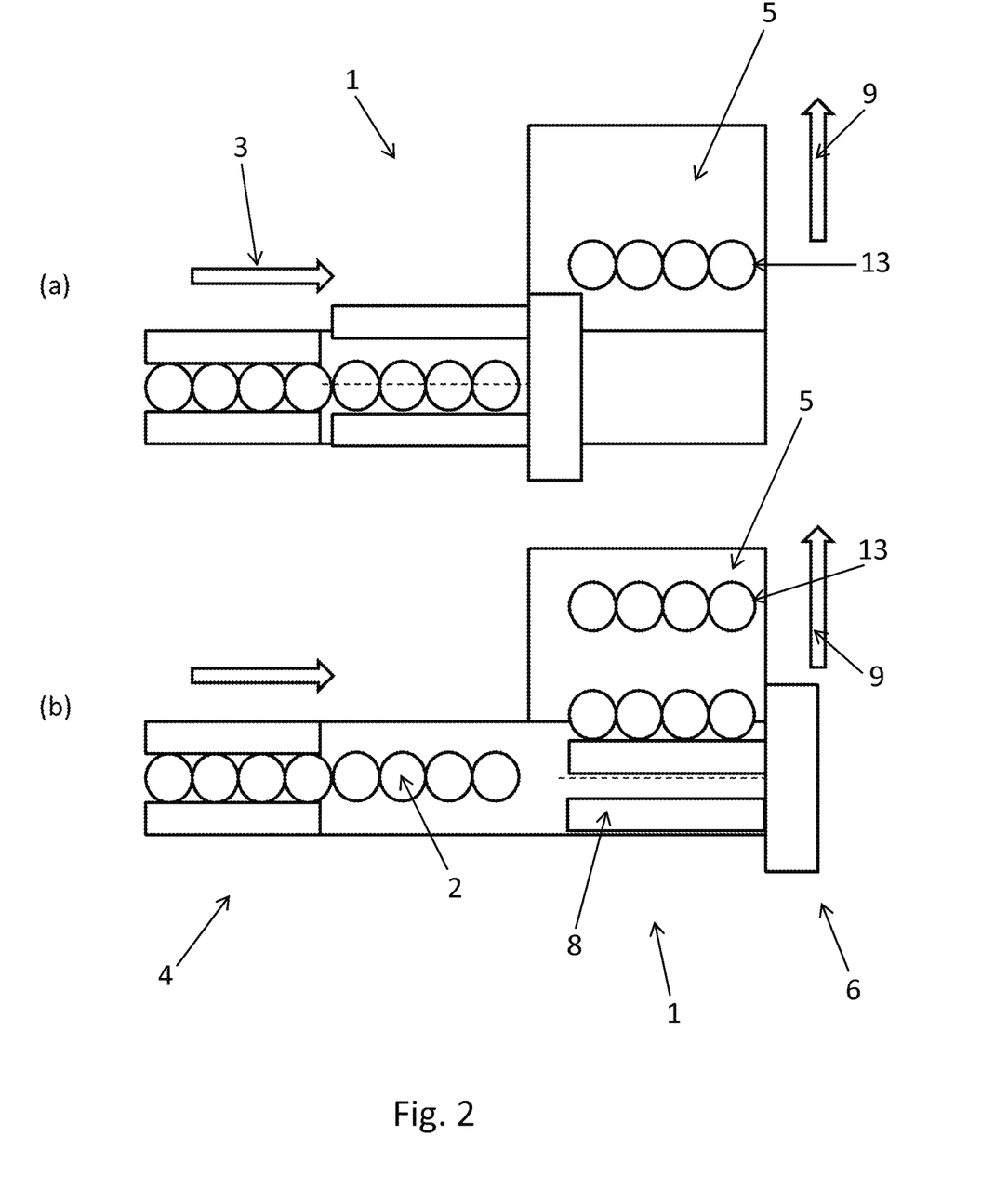
FIG. 2 shows two particular states during the process, namely FIG. 2a, the taking-up of the products, and FIG. 2b, the depositing of the products, and FIG. 3 describes the three successive steps during the rotation of products around their axis, seen from above.

FIGS. 2a and 2b describe the steps of the operation of the transfer device 1.

At the upstream end of the supply means 4, in FIGS. 2a and 2b, is shown a spacing device such as a timer that can be made either of a pair of endless screws facing each other or of a pair of chains or endless belts facing each other. This timer intervenes upstream from the device 1 for transfer of products and downstream from the machine for preparation of products.

This timer has as its function to compact the flow even also, if necessary, to create a spacing between each batch 13 of products 2 that will then be captured by a collector 8. This spacing is achieved by reducing the speed of the timer in relation to the speed of the supply means 4.

This spacing has as its function to create the batch of products so as to facilitate the introduction of the collector into the row of products.

As shown in FIG. 2a, the tool 6 is translated in the direction of the timer so as to raise the row of products as far as the downstream end of the timer. Then, one of the collectors 8 is synchronized with the batch of products to be captured, i.e., the collector is kept at the pace of the supply means 4 in the supply direction 3 of the batch 13 of products. In contrast, at the moment of the contact between the products and the collector, the speed of rotation of the collector is low, optionally almost zero, so as to prevent any unbalancing of the products captured. Finally, once the capture and the extraction of the batch of products is achieved, the tool resumes a certain speed of rotation combined with a speed of translation of the collector to raise the batch of product downstream from the supply means and this is preferably with a speed of translation of the collector greater than the speed of the supply conveyor.

The movement of translation of the tool 6 along the supply direction contributes to increasing the operating rate of this transfer device.

As shown in FIG. 2b, the tool 6 has raised the row of products downstream from the supply means, and by the movement of rotation of the collector, the batch of products has been deposited on the output conveyor 9.

In a preferred embodiment, the tool 6 can also perform a transverse movement in relation to the supply direction 3 of the products.

This transverse movement contributes to facilitating the depositing of the products and to increasing the range of the products that can be processed with the same type of tool.

Once the step of depositing the batch of products is complete, the collector begins the previously-described cycle again.

Figure 3:
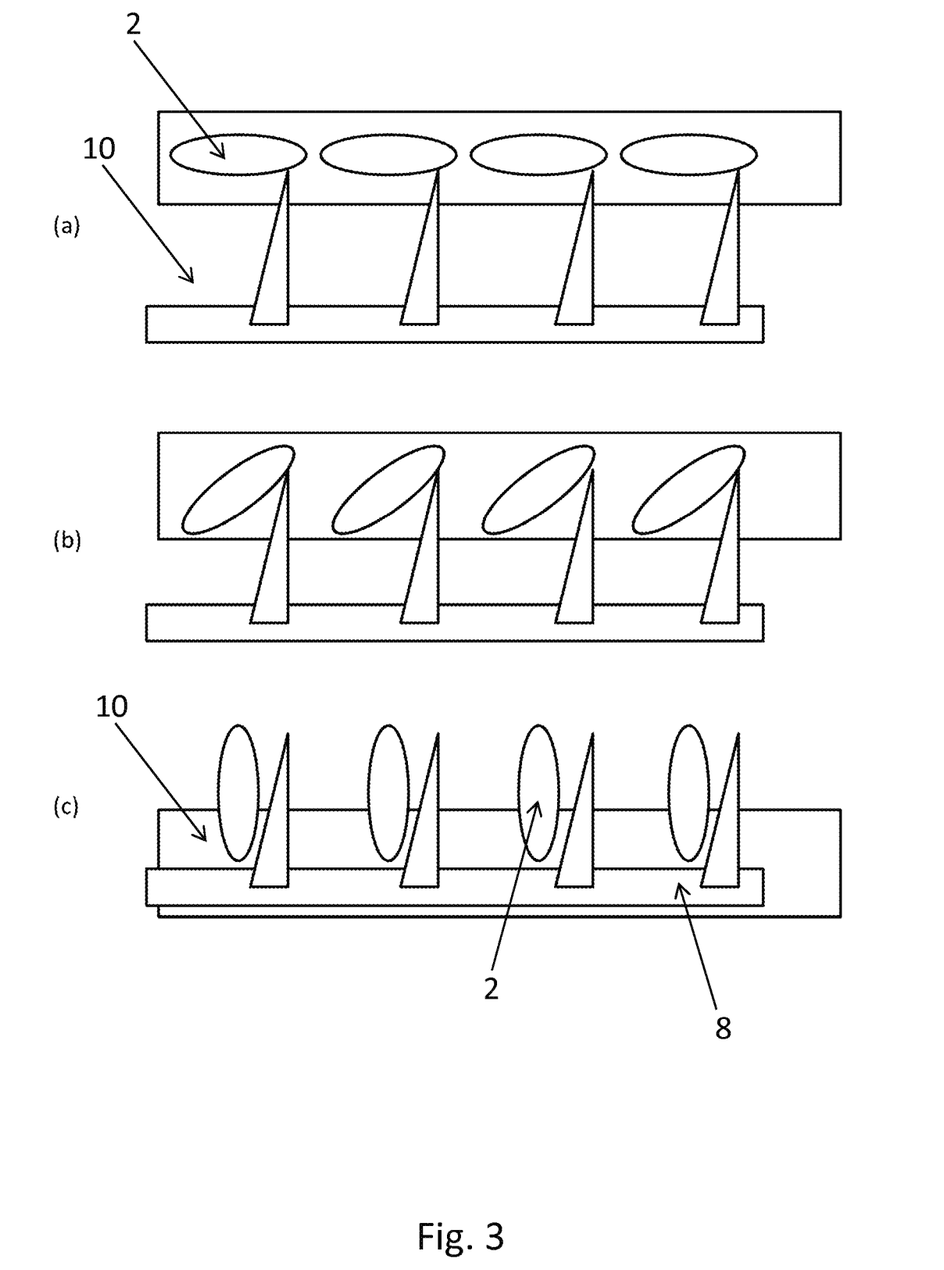

FIGS. 3a, 3b, and 3c describe the steps of the method for orienting products of particular shapes, other than cylindrical, or whose section is identical to itself once turned by a portion of a revolution.

During the implementation of this orienting method, the speed of the supply means 4 and the speed of the collector 8 following the supply direction 3 are approximately identical. However, as a function of the product to be pivoted, the speed can vary.

As shown in FIG. 3a, the products 2 are in line, in a row, on the supply means 4 following a supply direction 3. The collector 8 is located parallel to the supply direction and facing the products to be oriented.

In this embodiment, the notches 10 have the shape of a triangle whose vertex is made of two edges. This vertex points toward the products to be oriented when the collector 8 comes near. In the supply direction 3, the upstream edge forming the vertex is the edge on which the product is going to roll in order to be oriented.

As shown in FIGS. 3b and 3c, the collector is translated transversely in relation to the supply direction 3 of the products. This movement of translation is generated by the movement of rotation of the tool 6, even by the additional movement of the tool 6 in this direction. This movement of translation of the notch 10 causes the rotation of the products simultaneously along their vertical axes by pushing on the downstream end of the product 2. In other words, the movement of translation of the notch causes the rotation of the product using its vertical axis by causing the product to roll about on the upstream edge of the vertex of the notch.

This device for rotation of the product makes it possible to eliminate the upstream screw that is used to turn the products. The turning screws are tools adapted to the shape of the products to be turned. They are heavy, massive, and of specific designs. Further, they often cause scrapes, scratches or other damage of the surface of the product and its label. The rotation of the product by the tool itself contributes to eliminating these problems.

As a result of the invention, it is thus possible to extract groups of products continuously from a row, at a high rate, and without destabilizing the products or requiring an upstream device to create a spacing between the successive batches or groups.

Although the above description is based on particular embodiments, it is in no way limiting of the scope of the invention, and modifications can be provided, particularly by substitution of technical equivalents or by a different combination of all or part of the characteristics developed above.

The invention claimed is:

1. Device (1) for transferring products (2), comprising
   a means (4) for supplying said products (2), which moves them one behind the other in a supply direction (3),
   an output conveyor (5), extending from the supply means (4), transversely to the supply direction (3), and
   a tool (6) rotating around an axis of rotation (7) that is parallel to the supply direction (3), said tool (6) having collectors (8) distributed radially around said axis and being mobile in translation parallel to the supply direction (3).

2. Device according to claim 1, wherein the output conveyor (5) extends in an output direction (9) perpendicular to the supply direction (3), the tool (6) being able to move in the output direction (9).

3. Device according to claim 2, wherein each collector (8) has a series of notches (10), one next to the other, parallel to the axis of rotation (7), each notch (10) being intended to receive one product (2).

4. Device according to claim 3, further comprising a frame (11) made of beams (12), and both a first motor driving the tool (6) in rotation around the axis of rotation (7) and mounted on a first beam (12) that is mobile parallel to the axis of rotation (7), on which the tool (6) is attached cantilevered, and essentially vertical, as well as a second motor driving the first beam (12) in translation along a second beam (12), which is horizontal, parallel to the axis of rotation (7).

5. Device according to claim 2, further comprising a frame (11) made of beams (12), and both a first motor driving the tool (6) in rotation around the axis of rotation (7) and mounted on a first beam (12) that is mobile parallel to the axis of rotation (7), on which the tool (6) is attached cantilevered, and essentially vertical, as well as a second motor driving the first beam (12) in translation along a second beam (12), which is horizontal, parallel to the axis of rotation (7).

6. Device according to claim 1, wherein each collector (8) has a series of notches (10), one next to the other, parallel to the axis of rotation (7), each notch (10) being intended to receive one product (2).

7. Device according to claim 6, wherein the bottom of the notch (10) is convex for a continuity of contact during the rotation of the tool (6).

8. Device according to claim 7, wherein the notch (10) has a profile that, during the push toward the output conveyor (5) under the effect of the rotation of the tool (6), facilitates the rotation of the product (2) around an axis perpendicular both to the supply direction (3) and the output direction (9) of the output conveyor (5), said rotation of the product (2) being caused by the fact that said notch (10) can approach the product (2) asymmetrically in relation to its own axis of symmetry that is perpendicular to its base.

9. Device according to claim 8, further comprising a frame (11) made of beams (12), and both a first motor driving the tool (6) in rotation around the axis of rotation (7) and mounted on a first beam (12) that is mobile parallel to the axis of rotation (7), on which the tool (6) is attached cantilevered, and essentially vertical, as well as a second motor driving the first beam (12) in translation along a second beam (12), which is horizontal, parallel to the axis of rotation (7).

10. Device according to claim 7, further comprising a frame (11) made of beams (12), and both a first motor driving the tool (6) in rotation around the axis of rotation (7) and mounted on a first beam (12) that is mobile parallel to the axis of rotation (7), on which the tool (6) is attached cantilevered, and essentially vertical, as well as a second motor driving the first beam (12) in translation along a second beam (12), which is horizontal, parallel to the axis of rotation (7).

11. Device according to claim 6, wherein the notch (10) has a profile that, during the push toward the output conveyor (5) under the effect of the rotation of the tool (6), facilitates the rotation of the product (2) around an axis perpendicular both to the supply direction (3) and the output direction (9) of the output conveyor (5), said rotation of the product (2) being caused by the fact that said notch (10) can approach the product (2) asymmetrically in relation to its own axis of symmetry that is perpendicular to its base.

12. Device according to claim 11, further comprising a frame (11) made of beams (12), and both a first motor driving the tool (6) in rotation around the axis of rotation (7) and mounted on a first beam (12) that is mobile parallel to the axis of rotation (7), on which the tool (6) is attached cantilevered, and essentially vertical, as well as a second motor driving the first beam (12) in translation along a second beam (12), which is horizontal, parallel to the axis of rotation (7).

13. Device according to claim 6, further comprising a frame (11) made of beams (12), and both a first motor driving the tool (6) in rotation around the axis of rotation (7) and mounted on a first beam (12) that is mobile parallel to the axis of rotation (7), on which the tool (6) is attached cantilevered, and essentially vertical, as well as a second motor driving the first beam (12) in translation along a second beam (12), which is horizontal, parallel to the axis of rotation (7).

14. Device according to claim 1, further comprising a frame (11) made of beams (12), and both a first motor driving the tool (6) in rotation around the axis of rotation (7) and mounted on a first beam (12) that is mobile parallel to the axis of rotation (7), on which the tool (6) is attached cantilevered, and essentially vertical, as well as a second motor driving the first beam (12) in translation along a second beam (12), which is horizontal, parallel to the axis of rotation (7).

15. Method for transferring products (2) comprising
    supplying products (2) one behind the other in a supply direction (3),
    extracting the products (2) by successive batches (13) of at least two products (2) each, by a movement that is transverse to the supply direction (3), and
    removing the batches (13) of products (2) in an output direction (9) that is transverse to the supply direction (3), wherein
    the extraction of the products (2) takes place using a tool (6) driven with a rotary movement around an axis of rotation (7) that is parallel to the supply direction (3) and is accompanied by a movement of said tool (6) that follows the supply of the products (2).

16. Method according to claim 15, wherein the tool (6) is driven by a movement that is transverse to the supply direction (3) to accompany the extraction of the products (2) to the output conveyor (5).

17. Method according to claim 16, wherein the products (2) are supplied by the supply means (4), in the form of a belt conveyor, in a single-line column extending in the supply direction (3), then are extracted onto the output conveyor (5) by the tool (6) in batches (13) that, each, formed by the transverse push exerted by a collector (8) of the tool (6), extend in the supply direction (3), and that are separated from one another on the output conveyor (5) along the output direction (9).

18. Method according to claim 15, wherein the products (2) extend vertically, perpendicular both to the supply direction (3) and to the output direction (9) that is perpendicular to the supply direction, the movement of the tool (6) along the supply direction (3) during the extraction of the products (2) being such that the push of the tool (6) by rotation causes a change of orientation of said products (2) around their vertical axis.

19. Method according to claim 18, wherein the products (2) are supplied by the supply means (4), in the form of a belt conveyor, in a single-line column extending in the supply direction (3), then are extracted onto the output conveyor (5) by the tool (6) in batches (13) that, each, formed by the transverse push exerted by a collector (8) of the tool (6), extend in the supply direction (3), and that are separated from one another on the output conveyor (5) along the output direction (9).

20. Method according to claim 15, wherein the products (2) are supplied by the supply means (4), in the form of a belt conveyor, in a single-line column extending in the supply direction (4), (3), then are extracted onto the output conveyor (5) by the tool (6) in batches (13) that, each, formed by the transverse push exerted by a collector (8) of the tool (6), extend in the supply direction (4), (3), and that a separated from one another on the output conveyor (5) along the output direction (9).

* * * * *